Jan. 31, 1939.    G. MUFFLY    2,145,777
REFRIGERATING MECHANISM
Filed Aug. 26, 1935    8 Sheets-Sheet 1
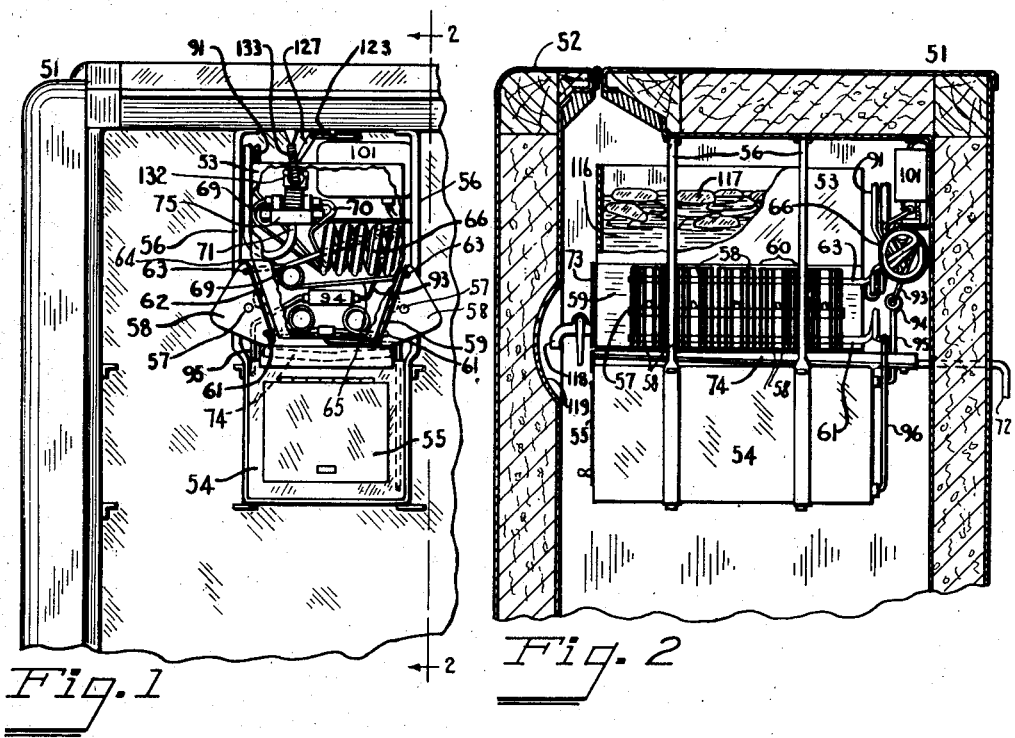
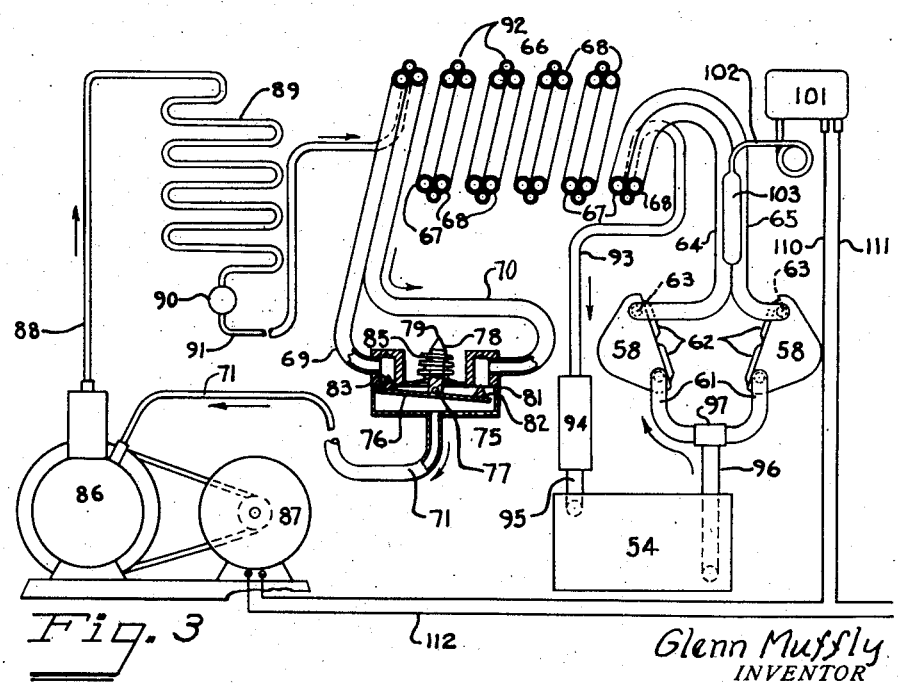
Glenn Muffly
INVENTOR
BY *Hanness Dickey Pierce & Hann*
ATTORNEYS

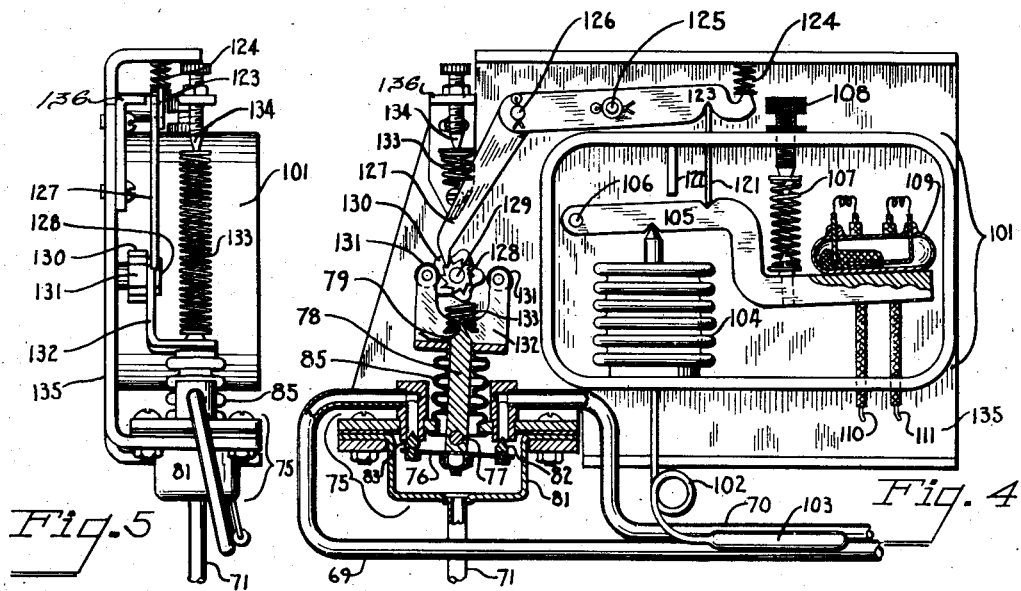

Jan. 31, 1939.　　　　　G. MUFFLY　　　　　2,145,777
REFRIGERATING MECHANISM
Filed Aug. 26, 1935　　　8 Sheets-Sheet 3
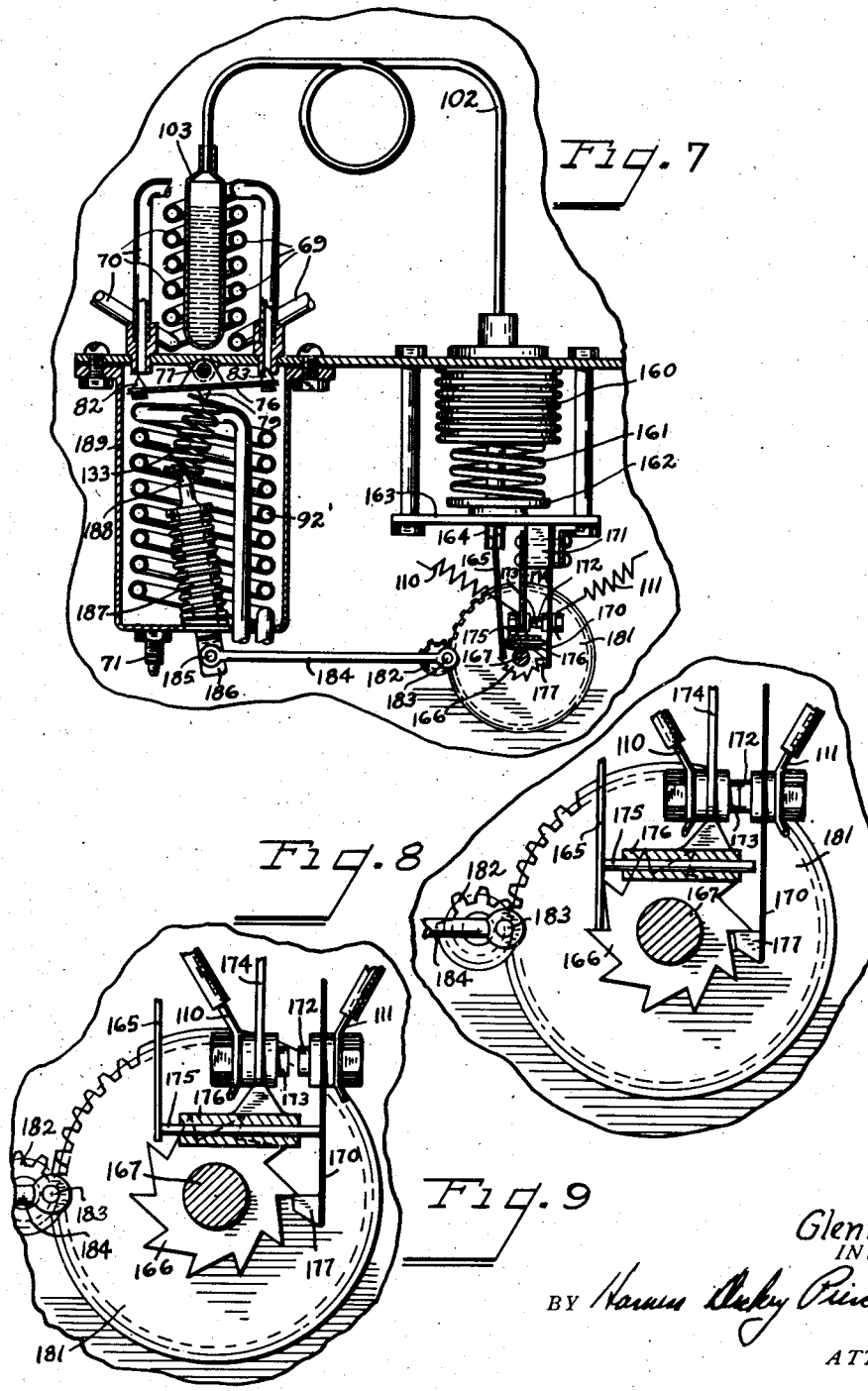

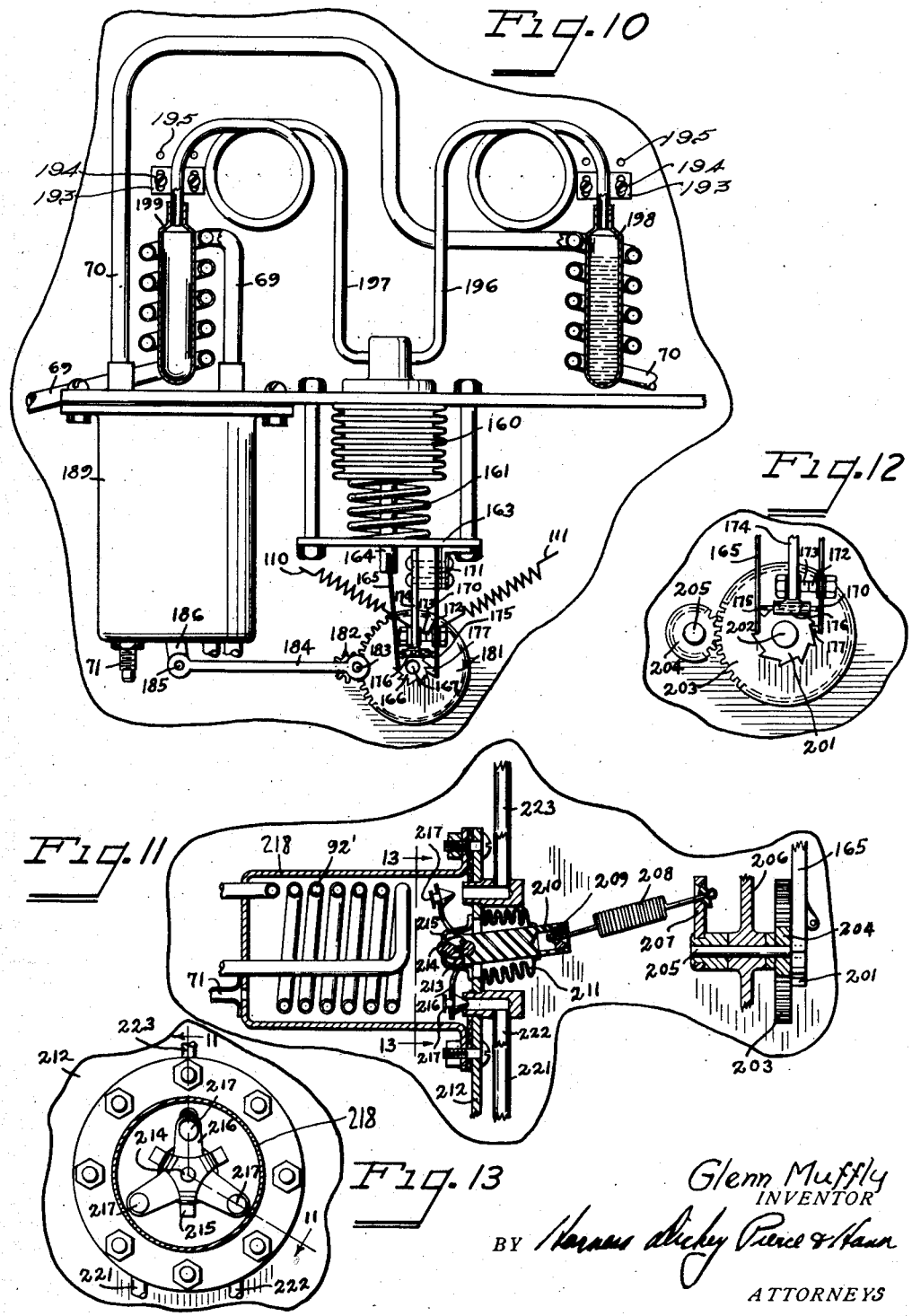

Jan. 31, 1939.　　　　G. MUFFLY　　　　2,145,777
REFRIGERATING MECHANISM
Filed Aug. 26, 1935　　　　8 Sheets-Sheet 5
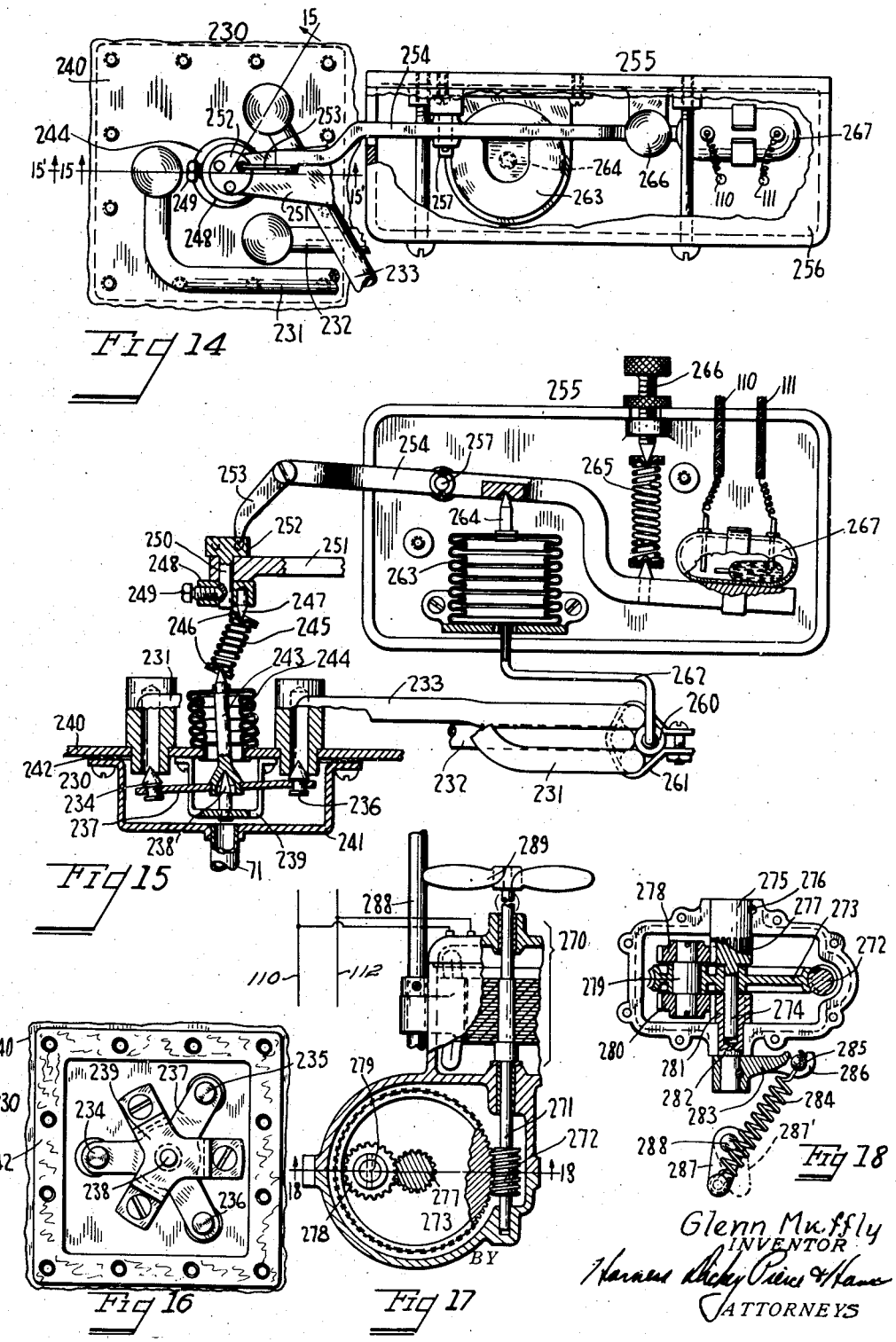

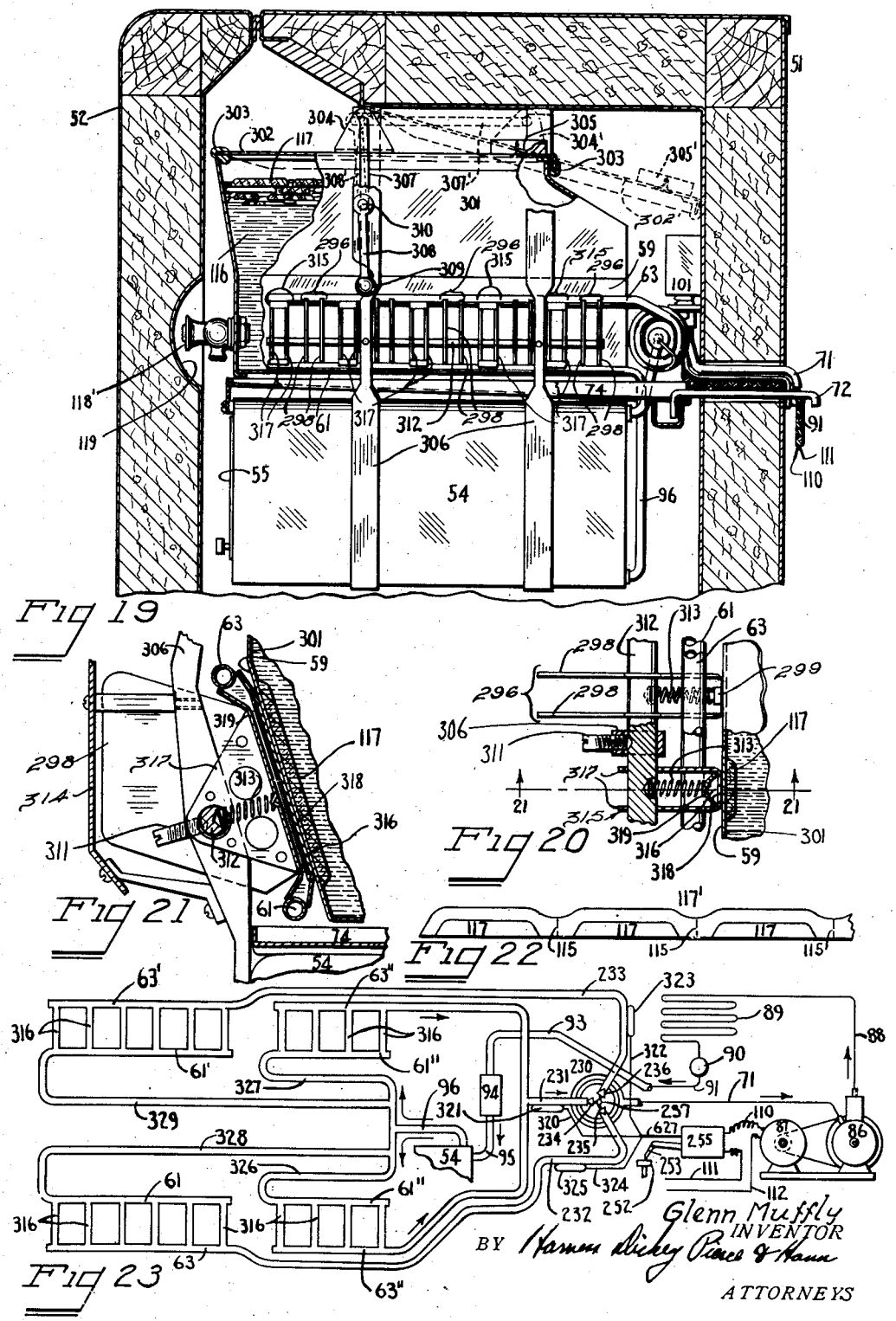

Jan. 31, 1939. G. MUFFLY 2,145,777
REFRIGERATING MECHANISM
Filed Aug. 26, 1935 8 Sheets-Sheet 8
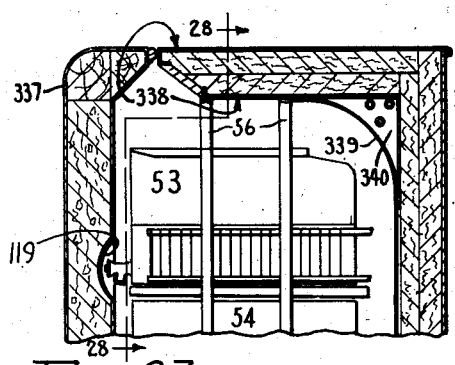
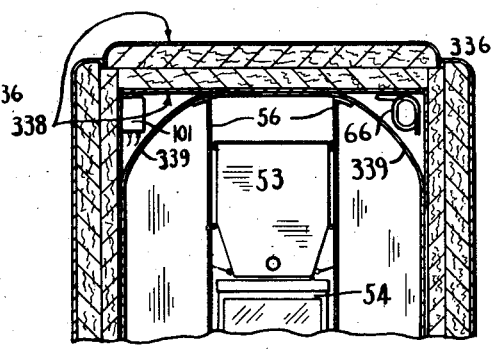
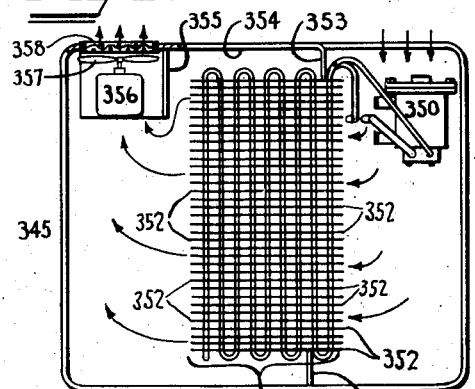
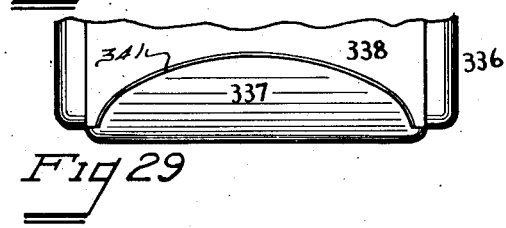
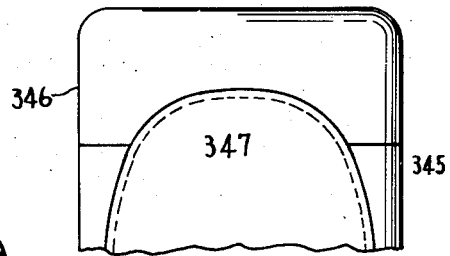
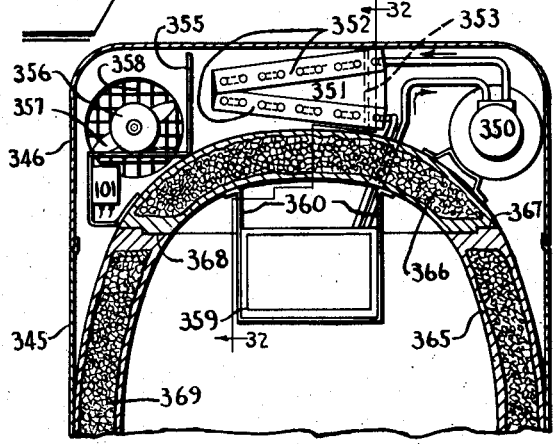
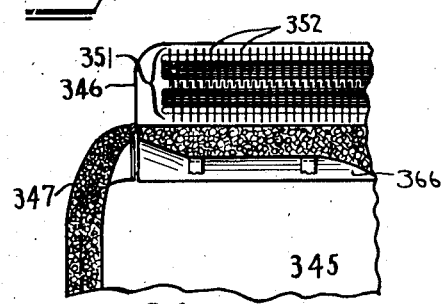
Glenn Muffly
INVENTOR
BY
ATTORNEYS Patented Jan. 31, 1939

2,145,777

UNITED STATES PATENT OFFICE 2,145,777

REFRIGERATING MECHANISM

Glenn Muffly, Springfield, Ohio

Application August 26, 1935, Serial No. 37,789

12 Claims. (Cl. 62—105)

This invention relates to mechanical refrigerating mechanism and particularly to the application of such systems for the artificial production of ice, and has particular relation to a simplified control mechanism for producing the cycles of freezing and freeing blocks of ice in ice making apparatus of the general type disclosed in my copending applications for Letters Patent of the United States Serial No. 697,124, filed November 8, 1933; Serial No. 719,099, filed April 5, 1934, and Serial No. 737,485, filed July 30, 1934, and in which certain features shown and described herein are broadly claimed.

Objects of the invention include the provision of means for cyclic operation of a refrigerating system in which the idle time of the condensing unit is utilized for effectively freeing the ice blocks most recently formed from their locations of freezing; and to provide a refrigerating system control mechanism in which a single thermostatic element effects both the cycling of the ice maker and the cycling of the condensing unit.

Other objects of the invention are to provide, in combination with a refrigerating system, heat exchange means for preventing the frosting of a flexible member employed in a valve structure thereof; to provide flat surface evaporator units contacting with flat surfaces of a water tank which is adapted for the freezing of masses of ice on its inner walls, and to utilize the weight of the water tank together with that of the water and ice contained therein in a manner to increase the pressure between the evaporator surfaces and the tank surfaces contacted thereby to a value considerably in excess of that which is represented by the weight of the tank and its contents.

Other objects are to provide a refrigerating system so constructed and arranged as to effect control thereof by means of a single thermally responsive element associated with two or more refrigerant conduits; to effect the operation of the control mechanism between two temperature limits of which the higher limit is represented by cabinet air temperature and the lower limit is represented by refrigerant vapor temperatures; and to combine heat exchange means between two or more refrigerant conduits with valve means regulating the flow of refrigerants in the system.

Other objects are to provide in a refrigerating system of the type described, an improved form of water tank and cover so arranged that the cover may be pushed backward in opening the tank and thus provide ready access to the tank without removing the cover; and to provide actuating and clamping means of novel form for the tank cover.

Other objects are to provide a novel form of refrigerant evaporator unit having fins integral with the surface which contacts a water tank so that better and surer defrosting to free the ice blocks formed within the tank is obtained; and to provide a refrigerating system of the type described having an improved support and spring mounting for the evaporators thereof.

Other objects of the invention are to provide a mechanical refrigerating system so constructed and arranged as to freeze bars of ice in such a manner that they are easily broken up into small blocks on natural fracture lines; and to provide a triple valve of improved and simplified form for use in connection with a mechanical refrigerator ice maker employing three sets of evaporator units of which two are defrosting while one is refrigerating for the purpose of making ice.

A further object is to provide an improved type of refrigerator cabinet, particularly adapted for use in connection with the type of ice maker above mentioned, and having an inner form conducive to the natural flow of air over the cold surfaces of the refrigerating system cooperating therewith.

The above being among the objects of the present invention the same consists in certain novel features of construction, combinations of parts and step or steps of operation to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary front elevational view of a refrigerator cabinet, with door open, showing the cooling elements and control mechanism for the refrigerating system in place.

Fig. 2 is a fragmentary vertical sectional view taken on the line 2—2 of Fig. 1, with the door closed and showing the cooling and control elements of the refrigerating system mainly in elevation, the water tank being partially broken away to disclose ice floating therein.

Fig. 3 is a diagrammatic view of the refrigerating system employed in the construction illustrated Figs. 1 and 2, showing the path of flow of the refrigerant.

Fig. 4 is an enlarged front elevational view of the control switch and valve mechanism shown in the previous views.

Fig. 5 is a view of the mechanism shown in Fig. 4, taken from the left-hand end thereof as viewed in Fig. 4.

Fig. 6 is a view similar to that shown in Fig. 4, illustrating a slight modification thereof in which the two functions of the control mechanism may be separated to produce a slightly different cycle of operation.

Fig. 7 is a partially broken, partially sectioned front elevational view of a modified form of control mechanism performing the same functions as the one shown in Fig. 4, but combining therewith the function of heat exchange between liquid and vapor refrigerant.

Fig. 8 is an enlarged detail view of the switch incorporated in the mechanism shown in Fig. 7, in closed position.

Fig. 9 is a view similar to Fig. 8 but showing the switch in open position.

Fig. 10 is a partially broken, partially sectioned side elevational view of a control mechanism identical with that in Fig. 7, but connected with two bulbs instead of with one as in Fig. 7.

Fig. 11 is a partially broken, partially sectioned side elevational view of a modified form of valve mechanism adapted to control three evaporator sections instead of two.

Fig. 12 is an enlarged view of the switch and ratchet mechanism shown in Figs. 7 to 10, inclusive, but modified for use with the triple valve shown in Figs. 11 and 13.

Fig. 13 is a vertical sectional view of the mechanism shown in Fig. 11, taken on the line 13—13 thereof.

Fig. 14 is a partially broken, partially sectioned top plan view of a valve and switch control assembly similar to that shown in Fig. 4, but employing a triple valve construction similar to that shown in Fig. 11.

Fig. 15 is a partially broken, partially sectioned side elevational view of the device shown in Fig. 14, with the cover 256 removed, showing parts 248, 250, 251 and 252 in section on line 15'—15' of Fig. 14, while the valve assembly below these parts is shown in section on line 15—15 of Fig. 14.

Fig. 16 is a bottom view of the triple valve shown in Fig. 15, with the cover 241 removed.

Fig. 17 is a partially broken, partially sectioned side elevational view of a gear drive which may be substituted for the thermally actuated levers and ratchet devices seen in previous views for the purpose of actuating the valve mechanism on a timed cycle instead of on a thermally controlled cycle.

Fig. 18 is a horizontal sectional view taken on the line 18—18 of Fig. 17.

Fig. 19 is a side elevational view, partly in section, showing a refrigerator cabinet and a slightly modified arrangement of parts therein, including the cover mechanism for the tank, the fins in pairs integral with evaporator units, and rounded sharp freezer to allow better air flow.

Fig. 20 is an enlarged, partially broken, partially sectioned side elevational view of a fragment of the structure shown in Fig. 19, showing a section through one of the evaporator units to illustrate the integral fin construction.

Fig. 21 is a sectional view taken on the line 21—21 of Fig. 20, showing the rocker shaft and spring support for the evaporator units.

Fig. 22 is a more or less diagrammatic view showing a block of ice as it might be frozen during a prolonged period of operation on one section of the evaporator shown in Figs. 19, 20 and 21, illustrating the lines of easy fracture.

Fig. 23 is a diagrammatic representation of a hook-up suitable for operation of three evaporator sections in a refrigerating system by means of a triple valve mechanism.

Figure 24:
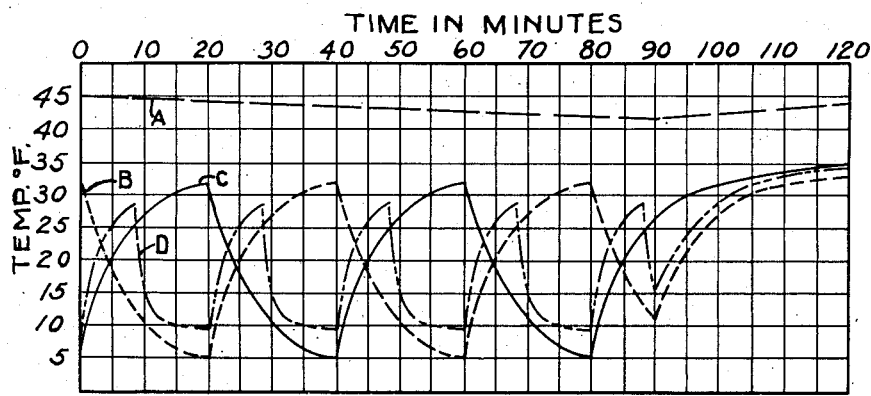

Fig. 24 is a graph showing typical temperature curves of a dual valve refrigerating system having two evaporator sections for ice making and using a separate thermostat such as seen in Fig. 6.

Figure 25:
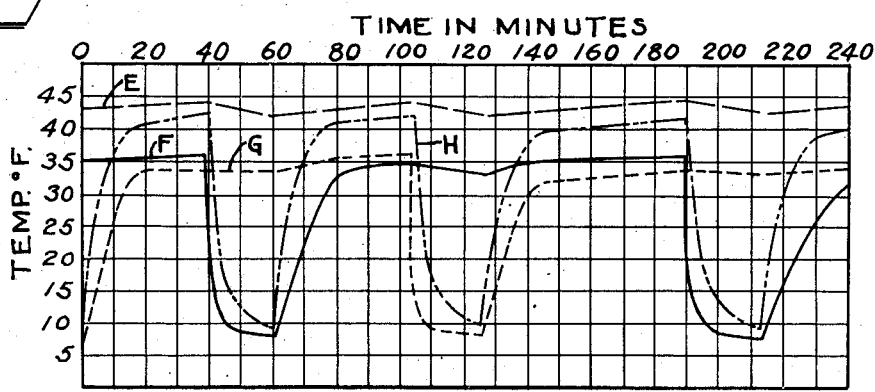

Fig. 25 is a similar graph showing curves for a system using the type of control seen in Figs. 4, 7 and 10, with an idle period following each freezing period.

Figure 26:
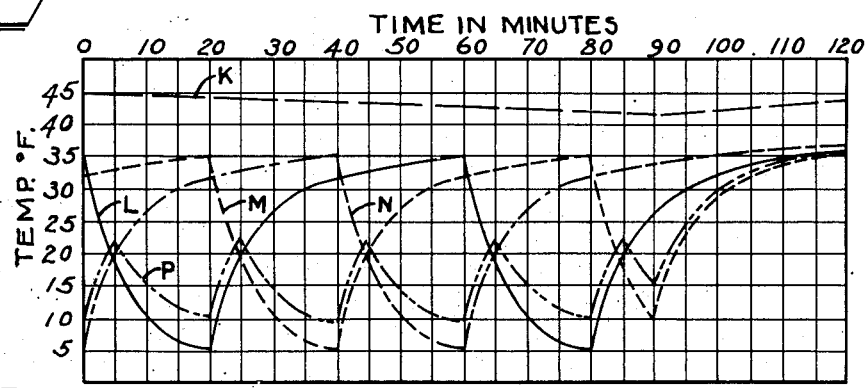

Fig. 26 is a graphic chart of temperatures obtained in a triple evaporator ice maker employing a triple valve which is actuated independently of the thermostatic switch, as by the gear drive seen in Figs. 17 and 18, or with the thermally actuated triple valve and a separate thermostatic switch controlling the operation of the motor which drives the compressor.

Fig. 27 shows a fragmentary vertical sectional view taken through a form of refrigerator cabinet particularly adapted for promoting a thermal circulation of air suitable for the functioning of the type of refrigerating systems shown in the preceding views, the cabinet having its liner rounded at the rear upper corner to just clear the rear of the water tank cover when it is pushed back for access to the tank.

Fig. 28 is a vertical sectional view taken through the cabinet shown in Fig. 27 as on the line 28—28 thereof, showing how the cabinet liner is rounded at the top of each side to facilitate air flow over the tank and fins and to avoid the warm upper corners found in most refrigerators.

Fig. 29 is a fragmentary top plan view of the refrigerator cabinet shown in Fig. 27, showing the curvature of the inverted L portion of the door.

Fig. 30 is a fragmentary vertical sectional view taken through a modified form of cabinet structure in which the insulation is curved along with the cabinet liner and a removable condensing unit occupies the space between the insulation and the outer shell.

Fig. 31 is a top view of the structure shown in Fig. 30 with the cover 346 removed, showing the arrangement of the condensing unit therein.

Fig. 32 is a fragmentary vertical sectional view taken on the line 32—32 of Fig. 30.

Fig. 33 is a fragmentary front elevational view of the cabinet shown in Figs. 30, 31 and 32 illustrating the form of door employed.

The present invention deals particularly with mechanism for continuously producing a supply of artificial ice and while the invention in its broader aspects is capable of application to refrigerating units of any desired size, it is particularly adaptable to those sizes of devices employed for domestic purposes and for that reason the illustrative embodiments of the invention herein shown and described are in connection with such types of refrigerators.

As in the case of my previous patent applications above identified, the present invention is in connection with an apparatus by means of which masses of ice are formed on one or more submerged walls or wall areas of a water tank located within a refrigerator cabinet of the domestic type, and means are provided for periodically discontinuing the refrigeration of such surfaces or surface areas whereby the ice formed thereon may melt free therefrom and float upwardly in the water within the tank, whereby upon resumption of the refrigeration of such walls or wall areas additional masses of ice will be again frozen thereon to be later freed therefrom and float upwardly in the water of the tank to comingle with the ice previously frozen. By this type of apparatus a constant supply of small individual masses of ice may be continually maintained in the water tank from which they may be readily dipped as desired whenever required for use. Additionally the water itself is maintained at a relatively low temperature. Thus the construction and arrangement is preferably such that the body of water in the tank does not itself attain a sufficiently low temperature to cause it to be frozen as a whole and as a result the individual masses of ice caused to be formed and to float upwardly therein are maintained in a relatively free conditon with respect to each other which permits their ready removal and use. Because of the fact that the bulk of the water in the water tank does not drop in temperature sufficiently to freeze the entire body thereof, the ice thus formed will continue to melt slowly, but it will be understood that any ice thus melting serves to replenish the main body of water from which the masses of ice are formed and, therefore, it is only necessary to replenish such water in the tank as may have been removed through ice actually removed from the tank, or water withdrawn from the tank for drinking or other purposes.

In order to admit of proper sanitation of devices of the type described and particularly where employed for domestic purposes, it is important that the water tank be readily removable for cleaning purposes and proper provisions are made to this end in accordance with the present invention.

It will also be understood that in refrigerators of the types herein under discussion, such refrigerators comprise a cabinet affording a suitably heat insulated chamber within which articles of food or the like may be stored for their proper preservation. Heat is extracted from the chamber by means of a suitable refrigerating mechanism and while, in the broader aspects of the present invention, the particular type of refrigerating system is immaterial, that is, to say whether it is of the mechanical compression type or of the absorption type, the former is shown by way of simplicity of illustration. In such a type of refrigerating mechanism it will be understood that a suitably driven compressor is provided for compressing the expanded and gasified refrigerant and discharging the same to a suitable condensing unit where, under the influence of pressure and reduction of temperature, the refrigerant is changed to its liquid phase. The liquid refrigerant from the condenser, or from a receiver when associated therewith, is conducted in liquid state to one or more suitable evaporators where the pressure upon it is reduced and it is permitted to expand, thereby to absorb heat, and when it has been so expanded or gasified it is thereupon returned to the compressor where it is again compressed and its heat content extracted or reduced.

In accordance with the present invention the evaporator assembly is made up of a plurality of individual evaporators or evaporator units, and means are provided whereby but one section of said evaporator or evaporator units is refrigerated at one time, the remaining sections or evaporator units being allowed to absorb heat during such time whereby to insure any ice which may have formed on the associated wall or wall areas of the water tank melting free from such wall or wall areas and be displaced therefrom, thereby to condition such wall or wall areas for the freezing of additional masses of ice thereon. All the evaporators or evaporator sections are successively subjected to such a refrigerating effect and subsequent rise in temperature so that all combine to provide an approximately continuously replenished supply of ice in the tank.

One of the main features of the present invention is the provision of a mechanism of the type described and control means therefor by the use of which not only is refrigeration of a particular evaporator or evaporator unit discontinued by stoppage of the flow of refrigerant through it during continued operation of the refrigerating system so as to permit the ice formed on the associated wall or wall area of the tank to melt free therefrom, but additionally to insure idle periods of the refrigerating system augmenting the warming period of each individual evaporator or evaporator unit.

Another feature of the present invention is the provision of a simplified water tank structure and evaporator or evaporator unit for co-operation therewith for the purpose described, resulting in a simplified construction more economical to manufacture than in the constructions disclosed in my prior applications above identified.

The control means operable to extend the warming up periods of the individual evaporators or evaporator units also forms an important feature of the present invention as do a number of other individual features of construction and arrangement of parts that will now be specifically described.

Referring to Fig. 1 a refrigerator cabinet 51 is shown with the door opened or removed and a considerable part of the cabinet broken away. The ice and water tank 53 is broken away to show only its outline so that the control parts located behind it are visible. Below the tank is the sharp freezer 54 which is provided with insulated walls and with the insulated door 55. It is supported by the hangers 56 which also support rocker shafts 57, which in turn support the fins 58 which are part of the evaporator units contacting the two angularly disposed flat surfaces 59 of the tank 53. It will be understood that the liquid refrigerant is first discharged into the low pressure side of the system in the evaporating means associated with the sharp freezer 54, and is then conducted to the evaporator units of the ice making part of the system.

The evaporator units 60 (Fig. 2), of which five are located on each side of the tank, are each formed with two rectangular contact areas 62 (Figs. 1 and 3) which contact the flat angularly disposed walls 59 of the tank to thereby support it. It will be seen that the surfaces 59 are disposed at angles of less than forty-five degrees from the vertical, hence the tank by its wedging action between these surfaces, which support it, will bear upon the surfaces 62 with a total force considerably in excess of the proportional weight of the tank and its contents, thus insuring a good thermal contact between the tank and the evaporator units. Furthermore, because the units 60 are pivoted on the rocker shafts 57, and because the walls of the tank 53 are preferably formed from thin metal, the units may rock and the walls yield to insure full area of contact between all the areas 62 and the surfaces 59 of tank 53.

Due to the V formation of the lower part of the removable tank 53, it may be advisable in some cases to provide a support for tank 53 to make it more stable in its upright position when removed from the cabinet. One method of doing this is to attach the false front 73 to the tank 53 as seen in Fig. 2. This front plate has a width substantially equal to that of the tank to which it is rigidly attached and with which it is removable from the cabinet. Being substantially flush with the bottom of the tank, this plate prevents sidewise tipping of the tank when placed on a flat surface such as a table top.

The door 52 (Fig. 2) is of the inverted L type which I have disclosed in co-pending applications hereinbefore identified. One of the refrigerant inlet manifolds 61 supplies the various evaporator units 60 on one side of the tank 53 with refrigerant of which a substantial part is still in the liquid phase, although under low or evaporating pressure. This refrigerant evaporates in the various evaporator units 60 on such side of the tank 53 and exits through the corresponding outlet manifold 63. Refrigeration of the evaporator units 60 causes heat to be extracted from the contacting walls of the tank 53 and from the water immediately adjacent such wall areas so as to cause such water to be frozen into ice. After ice has been frozen on the inner side of one of the angular walls 59 of the tank 53 the control 101 acts to stop refrigeration so that the ice blocks may be melted free from the wall by means of heat picked up by the fins 58 from the air within the cabinet. In the meantime refrigeration will be produced in the evaporator units contacting the other angular wall 59 of the tank, as will be explained in more detail in connection with following views.

Fig. 3 shows diagrammatically the relationships between various parts seen in Figs. 1 and 2 and includes a representation of the "high side" or condensing unit of the system. Refrigerant flow may be traced in Fig. 3 as follows: Refrigerant vapor leaving the left-hand manifold 63 passes through the tube 64, which contacts the bulb 103 of the control 101, to the coil 68 of the heat exchanger 66 and after passing through this coil is led by tube 70 to the valve assembly 75 into which it is free to pass because the valve 82 is lifted from its seat. This allows the refrigerant vapor to enter the housing 81 of the valve assembly, from which it exits through tube 71 to the suction side of compressor 86.

After refrigerant vapor has been compressed by the compressor 86 it is discharged through tube 88 to the condenser 89, where it is liquefied and then drained into receiver 90. The liquid refrigerant leaves the receiver through tube 91 and passes through the helically wound tube 92 of heat exchanger 66 in counter flow association with the vapor tubes 67 and 68. The liquid gives up a considerable part of its specific heat to the vapor in the active tube 68 and then passes through the tube 93 to the pressure reducing device 94, which may be an expansion valve, a capillary restrictor, a float valve or equivalent device.

The liquid refrigerant, now under reduced pressure, enters an evaporating coil (not shown) in the sharp freezer 54 from which it exits in partially evaporated state through tube 96 to the T 97 at which point it is free to pass into whichever one of the manifolds 61 is active at the moment. It will be seen that if the rocker arm stem 78 of the valve assembly 75 were moved to the left about its pivot 77 by an angular pressure upon the point 79, the valve 82 would be closed and the valve 83 would be opened, since they are both mounted upon the valve rocker 76 associated with the stem 78. This would change the path of refrigerant, causing it to flow from the T 97 through the right hand manifold 61 and the right hand set of evaporator units to the tube 65 and thence through the tube 67 of the heat exchanger 66 and the tube 69 to the valve port opened by the valve 83.

The rocker 76 of valve assembly 75 is actuated by means of spring pressure upon the point 79 or by mechanical means energized by control 101, as will hereinafter be explained in more detail. The control 101 also actuates a switch for closing the circuit through motor 87 by effecting contact between line wire 111 and motor wire 110. The other line wire 112 leads directly to the motor 87.

In Fig. 4 we see an enlarged detail view showing how the valve assembly 75 and the control assembly 101 are associated so that the former is actuated by the latter. For the sake of simplicity the thermostatic bulb 103 is shown contacting tubes 69 and 70 instead of tubes 64 and 65, thus omitting the heat exchanger 66 from this figure.

Valve 82 is shown open, hence refrigerant vapor is passing from the tube 70 to the tube 71 in the same manner as illustrated in Fig. 3. The circuit comprising wires 110 and 111 is closed as seen in Fig. 4 due to the bellows 104 of the control 101 being expanded so that the arm 105 has swung upward on its pivot 106, compressing the spring 107 and tilting the mercury bulb switch 109 to its closed position. The compression of spring 107 is adjusted by means of a screw 108 to vary the temperatures at which switch 109 is opened and closed. The bellows 104 is responsive to the vapor pressure in the bulb 103 which is partially filled with a volatile liquid in accordance with conventional practice, and connected with the bellows by means of the tube 102.

Since it is considered that cold refrigerant vapor is passing through the tube 70, the vapor pressure in bulb 103 and bellows 104 is being gradually reduced so that finally the spring 107 will overcome the expansive force of bellows 104 and allow the arm 105 to tilt downward until the circuit including wires 110 and 111 is broken by the mercury switch 109. Before the downward movement of arm 105 has caused the switch 109 to open it will have moved downwardly far enough to allow the push rod 121 to let the arm 123 rock in a clockwise direction under influence of spring 124, raising the pin 126 at the left end of rocker 123 in turn lifting the pawl 127 until it falls into engagement with the next higher tooth of ratchet wheel 128.

After the circuit is broken in the switch 109 of control 101, the motor 87 will be idle, hence no refrigerant will be drawn through any of the units 60 and no refrigerating effect will be produced upon the bulb 103, which consequently warms up, approaching the temperature of the air within the cabinet while this air temperature itself is also rising due to the stoppage of active refrigeration. This rise of temperature of the bulb 103 produces an increased vapor pressure within the bulb and vapor passing from the bulb through the tube 102 to the bellows 104 causes the bellows to expand, compressing springs 107 and 124. The upward push of the bellows transmitted to the rocker 123 causes it to move in a counterclockwise direction about its pivot 125. This exerts a downward push on the pawl 127 causing the ratchet wheel 128 to move in a counterclockwise direction upon the fixed stud 129. The cam or star wheel 130 is secured to the ratchet wheel 128 and is rotated thereby upon the stud 129.

In the position shown in Fig. 4 the star wheel 130 is located with a tooth pointing toward the roller 131 at the right while the roller 131 at the left has moved nearer to the star wheel 130 and is located between two teeth thereof. The spring 133, which is broken away in Fig. 4 but seen in full in Fig. 5, is compressed between the adjustably fixed point 134 and the movable point 78 of the valve rocker stem 78, thus holding the valve 83 against its seat. The roller 131 at the left of star wheel 130 is not contacting the star wheel, but there is a very small clearance between these parts so that the star wheel 130 need be moved but a few degrees before it contacts the roller 131 and begins to move the fork 132 which is rigidly attached to the valve rocker stem 78.

During the idle period of the condensing unit the bellows 104 is expanding, as before explained, and this produces the movement of star wheel 130 which causes the valve stem 78 to move to the left until it passes the center line and the spring 133 causes it to move farther to the left until stopped by the engagement of valve 82 with its seat. Since the ratchet wheel 128 has ten teeth and the star wheel has five teeth, a movement of one tooth on the ratchet wheel will bring a space of the star wheel in line with the right hand roller 131 so that the next downward movement of the pawl 127 will cause the valve mechanism to snap back to the position shown in Figure 4. The stem 78 is soldered or otherwise sealed to the flexible metal bellows 85 which is in turn soldered to the upper portion of housing 81, which is made gas-tight with a gasket.

It will be noted that bracket 136 for pointed screw 134 is attached to part 135 by means of two screws and that it is slotted for the upper screw, making the point adjustable sidewise on an arc about the lower screw. This provision is made so that the dead center line of spring 133 may be varied to obtain equal temperatures of operation for the movements to left and to right of the fork 132. Such an adjustment has been found highly desirable in equalizing the lengths of idle periods after freezing on the right side and after freezing on the left side. The point 134 is also adjustable vertically to vary the compression of spring 133, thus providing an additional adjustment of the temperature at which the valve mechanism is operated.

Fig. 6 illustrates a slightly modified arrangement of parts by means of which the functions of the switch mechanism and of the valve mechanism may be separated to produce cycles of the ice maker independently of the cycles of condensing unit operation produced by a conventional thermostatic switch. The supporting member 135 is the same as in Figs. 4 and 5 and supports some of the same parts thereon, but is arranged differently in some respects and includes additional parts. The thermostatic switch 154, its tube 153, and the bulb 152 perform their usual functions of opening and closing contacts between the wire 110 and the wire 111 in response to temperature changes of the bulb 152, which is preferably located where it is affected by the temperature of air within the refrigerator cabinet.

The bulb 140 replaces bulb 103 of Fig. 4 in contact with tubes 69 and 70, causing bellows 142 to expand and contract with the changes of vapor pressure of a volatile liquid within the bulb 140. When the tube 70 drops in temperature, due to the start of "frost-back" from the evaporator assembly with which this tube is associated, the bulb 140 is chilled and the bellows 142 contracts under the force of spring 147 which is powerful enough to turn the ratchet wheel 128 through the medium of the pawl 127, thus snapping the valve mechanism to the left and opening valve 83 (Fig. 4). This action takes place during operation of the compressor and shifts the refrigerating effect to the opposite side of the tank independently of the thermostatic switch 154.

The closing of the valve associated with tube 70 (82 in Fig. 4) stops the flow of cold refrigerant through tube 70 and allows bulb 140 to warm up, approaching the temperature of air within the cabinet, which expands bellows 142 and re-compresses spring 147, lifting pawl 127 into a new notch of ratchet wheel 128. After the freezing operation has been completed on the side of the tank now refrigerated the tube 69 will drop in temperature due to the start of "frost-back" and cause the bellows 142 to contract again, snapping the valve mechanism back to the position which allows flow of refrigerant through the tube 70 and closes the outlet port of the tube 69.

In either Fig. 4 or Fig. 6 the bulb (103 and 140 respectively) might be in thermal contact with the assembly 75, say on bottom cover of the housing 81, instead of contacting the two tubes 70 and 71. The effect is substantially the same, but slightly delayed, which calls for a slightly different adjustment of the control.

The screw 148 and its lock nut 149 are provided for the purpose of adjusting the compression of the spring 147 to obtain the desired cycles of operation. The strength of the spring 147 and the setting of the screw 148 should be such that the valve mechanism will be actuated before enough frost has accumulated to interfere with the action of the bellows 85 or to represent a material loss of refrigeration to the suction line 71. On the other hand the setting of the screw 148 and the strength of the spring 147 must be such that the pawl 127 is lifted into engagement with the next tooth of the ratchet wheel 128 during the warm-up period which follows each switch of the valve mechanism and before the freezing on the new side has progressed far enough to again start the frosting-back which causes bellows contraction. The cycle of operation produced by a control as seen in Fig. 6 is further explained by the graph shown in Fig. 24.

In Fig. 7 the bulb 103 is associated with the two tubes 69 and 70 for the same purpose as in Fig. 4, but in this view the tubes are shown coiled in parallel around the bulb 103. The bellows 160 acts in the same manner as the bellows 104 of Fig. 4, but is shown in inverted position and connected with a different mechanism, employing open contacts instead of the enclosed mercury type of switch shown in Fig. 4. The types of switch mechanisms and contacts might vary greatly without departing from the spirit of this invention, hence I show only two types of switches; the mercury bulb type, which may be actuated by a slow movement, and a spring-snap type, which produces a sharp break of the current by mechanical means. It will be understood that I do not limit myself to the particular mechanisms shown in this respect.

Fig. 7 will fit into the diagrammatic view of

Fig. 3 in the same way that Fig. 4 does, with the heat exchanger 66 omitted in this case because the single heat exchange coil 92' carrying warm liquid refrigerant through the housing 189 has been added. In the sectional portion of Fig. 7 the plane of section of the bulb 103 and of the two tubes coiled around it is taken at the rear of the plane of the section through the two valve ports and parts 92' and 189 in order that the incoming ends of the tubes 69 and 70 may be shown as behind the vertical legs of the same tubes which connect with the ports controlled by the valves 82 and 83. It will be understood that the bulb 103 responds equally to temperature drops of the helically wound portion of the tube 69 and to temperature drops of the helically wound portion of the tube 70, being exposed to an equal length of each at a uniform distance therefrom. The action is the same as in Fig. 4, where the bulb 103 contacts an equal length of each of the tubes 69 and 70.

When the bellows 160 contracts under pressure of the spring 161 in response to a drop of temperature of the volatile liquid in the bulb 103, the stem 164 moves upward with respect to the retaining wall 163 and the ten tooth ratchet wheel 166. The spring 165 is thus moved from the position seen in Figs. 7 and 8 to the position shown in Fig. 9. When the spring 165, in its upward travel, falls off of the tooth against which it is bearing on the ratchet wheel 166 it strikes the end of the push rod 175 causing it to slide to the right in its bearing 176 and strike the leaf spring 170 which it moves to the right, causing the contact 172 to snap away from the contact 173 against which it has been bearing under action of the spring 170. Contact 173, supported by the rigid arm 174, remains fixed while the contact 172 moves away from it. The arm 174 is electrically insulated by being supported by the insulating block 171, but the contact 173 and the conductor 110 may be insulated from arm 174 instead if desired. Likewise the contact 172 and the conductor 111 may be insulated from the spring 170 by means of a washer and a bushing of non-conducting material.

The electrical connection between the conductors 110 and 111 is broken by the contraction of the bellows 160 in exactly the same manner that the contraction of the bellows 104 in Fig. 4 breaks the circuit therein, although through the medium of a different mechanism. Likewise the expansion of the bellows 160 due to stoppage of refrigeration will cause the opening of the valve 83 and the closing of the valve 82 as in the case of Fig. 4, through the medium of mechanism described below.

As the bellows 160 (Fig. 7) expands due to stoppage of refrigerating effect in both of the tubes 69 and 70 and because of the rise of air temperature resulting from stopping the compressor 86 (Fig. 3) it compresses the spring 161, moving the stem 164 and flat spring 165 downwardly from the position shown in Fig. 9 to the position shown in Fig. 8, rotating the ratchet wheel 166 and the gear 181 which is fixed for equal rotation with the ratchet well 166, one-tenth of a revolution. During this rotation a tooth of the ratchet wheel 166 engages the lug 177 on the end of the spring 170, holding the contact 172 away from the contact 173, and at the end of the 36 degrees of rotation the lug 177 drops into the next notch in the ratchet wheel 166, allowing the contact 172 to touch the contact 173, reclosing the circuit, which starts the motor 87 (Fig. 3) and operates the compressor.

During this counter-clockwise rotation of the gear 181 it has been rotating the pinion 182 with which it meshes. The ratio of teeth on the gear to teeth on the pinion is five to one, hence during 36° of gear movement the pinion will have moved 180° or one-half of a revolution in a clockwise direction. It will be noted that no movement of the ratchet wheel 166 has occurred between Figs. 8 and 9 since the only change has been the upward movement of the spring 165 and the resulting opening of the switch. During the next downward movement of the spring 165 to the position shown in Fig. 8, the ratchet wheel 166 and the gear 181 will have been moved, bringing the crank pin 183 fixed to the pinion 182 and the connecting rod 184 to their extreme leftward positions (not shown), which will cause the rocker arm 186 (Fig. 7) to pivot upon its bearing concealed within the bellows 187, moving the point 188 to the extreme right, and carrying with it the lower end of the spring 133, which then acts upon the point 79 of the valve rocker 76 to open the valve 83 and close the valve 82.

The action is similar to that explained in connection with the construction illustrated in Fig. 4, in that the expansion of the bellows due to non-refrigeration of bulb 103 causes the valve mechanism to move, opening one valve and closing the one that has been open and then closing the switch, while the cooling of the bulb 103 which results from the closing of the switch and completion of an ice-forming period causes the bellows to contract until the pawl (here represented by the spring 165) falls into the next notch of the ratchet wheel and the circuit is opened.

The spring 161 (Fig. 7) is provided with an adjustable seat at its lower end on the nut 162 which has a threaded engagement with the member 163. The spring force effective upon the movable end of the bellows 160 is thus adjustable for regulation of the cycles produced by this control mechanism. If desired, an additional spring or leverage adjustment may be provided in any of the well-known forms of such mechanisms for the purpose of making the temperature adjustments for range and for high and low limits separately and independently.

Fig. 10 is a duplication of Fig. 7 with the exception that some details have been omitted and the coils of tubes 69 and 70 are shown as separately coiled, one about bulb 199 and the other about bulb 198. Both bulbs are connected with the same bellows 160. This view is shown to illustrate a principle which may be employed in connection with a control of the nature described. In such a construction and with a charge of volatile fluid which is more than enough to fill one bulb in the liquid phase the bellows will respond to the temperature of the warmer bulb exactly as if the other bulb were not connected; and with a charge of volatile fluid which is small enough so that all of the liquid portion may be contained in one bulb the bellows will respond to the temperature of the colder bulb exactly as if the other bulb were not connected. Where there are more than two bulbs connected to a single bellows and the liquid charge may be contained in any one bulb, the bellows will respond to the temperature of the coldest bulb, since that is where the liquid will be and the vapor pressure is established by the warmest liquid in the system as soon as equilibrium is established.

Should there be only one large bulb and one small bulb connected with the same bellows and the liquid charge be more than enough to fill the smaller bulb and less than enough to fill the large bulb the result would be that the bellows would always respond to the temperature of the larger bulb no matter which of the bulbs were the colder, for the liquid-vapor contact would always be in the larger bulb.

From the above it will be clear that the construction shown in Fig. 10 will operate in exactly the same manner as that shown in Fig. 7, expanding the bellows in accordance with the rise of air temperature when neither tubes 69 nor 70 are refrigerated and contracting the bellows in accordance with the temperature of the colder of the two tubes. This principle applies equally to a system in which three bulbs are connected with one bellows, so long as any one bulb will contain all of the volatile liquid with which the connected bulbs and bellows are charged.

It will thus be seen that there might be three suction tubes instead of the two (69 and 70), with three bulbs instead of the two (198 and 199), and that the bellows 160 of Fig. 10 would act in response to the vapor pressure established by the coldest of the three bulbs. Such a system will be described later in connection with Fig. 23, where three separate suction lines (231, 232 and 233) have three seperate bulbs (321, 325 and 323) associated with them and with a single control bellows.

Bulbs 198 and 199 are separately adjustable vertically to vary the influence of tubes coiled around them. Slotted ears 193, screws 194 and extra tapped holes 195 are provided for this purpose. This adjustment compensates for any inaccuracies in the valve mechanism or differences between the two evaporator sections, as does the adjustment of part 136 in Figs. 4, 5 and 6.

Fig. 11 is a sectional view through the axis of a valve mechanism designed to control three suction passages in place of the two passages (tubes 69 and 70) seen in previous views. The operating mechanism seen at the right of Fig. 11 is shown in Fig. 12, which may be considered a modified detail of Fig. 10 with nine teeth on the ratchet wheel instead of ten. Fig. 13 is a section of Fig. 11 on the line 13—13 thereof and conversely Fig. 11 is taken on line 11—11 of Fig. 13.

Referring to Figs. 11 and 13 it is seen that there are three valves 217 carried by the tilting spider 216, which is pivoted upon the ball 213 of the stem 214 mounted upon the fixed spider 215, and that for any given position of the arm 207 and the spring 208 there is but one of the valves 217 lifted from its seat while the other two are held closed by the spring 208.

The arm 207 is carried upon a shaft 205 (Figs. 11 and 12), which is actuated by the pinion 204, best seen in Fig. 12. The ratchet wheel 201 is actuated in the same manner as the ratchet wheel 166 shown in previous views, but it has nine teeth in place of ten, hence the shaft 202, with which the ratchet wheel 201 is rigidly connected, turns one-ninth of a revolution or 40°, instead of 36° as in the case of shaft 167 in Figs. 7, 8 and 9 during each expansion of the bellows.

The switch parts in Fig. 12 operate exactly as described in connection with Figs. 7, 8 and 9, but the gear 203 turns 40° during each warming up period. The pinion 204, driven by the gear 203, has one-third as many teeth as the gear, hence for each ratchet tooth of 201 the pinion 204 makes one-third of a revolution.

The shaft 205, upon which the pinion 204 is rigidly mounted, is thus turned through 120° each time that the bellows 160 expands during an idle period of the compressor 86, seen again in Fig. 23. Since this shaft 205 carries the arm 207, to the outer end of which one end of the spring 208 is connected by ball-and-socket joint, it will be understood that at the end of each 120° movement of the arm 207, caused by an expansion of the bellows, the arm and the spring come to rest in a position which holds one of the three valves 217 open and the other two closed. At each 40° movement of the ratchet wheel the outer end of the spring 208 moves 120°, causing the open valve 217 to snap shut and another of these three valves to open. Thus only one of the three suction tubes 221, 222 and 223 is open to the interior of the housing 218 at a time and the refrigerating effect produced by this tube on one of the three bulbs will cause the next contraction of the bellows 160.

Warm liquid refrigerant, passing through the tube 92' coiled within casing 218 (Fig. 11) gives up some of its heat to the cold vapor which enters through the open valve and exits to the suction tube 71, thus maintaining the housing 218 and associated parts at a temperature which prevents excessive frosting of the bellows 211, thus insuring that the bellows retains its flexibility.

The housing 218 is secured with bolts or suitable holding means to the wall 212 which supports the valve assembly, and a gasket between these parts makes the housing gas tight. The operation of a triple valve mechanism such as is seen in Figs. 11, 12 and 13 by a bellows such as seen in Fig. 10, but with three bulbs and three suction tubes is believed to be well explained above, but for further clarification I show a slightly modified assembly in Figs. 14, 15 and 16.

The valve assembly 230 seen in Figs. 14, 15 and 16 is quite similar to the one shown in the three preceding views, but the spring 245 (Fig. 15), under compression, replaces the tension spring 208 of Fig. 11 and the operation is effected without the use of gears.

Referring to Fig. 15 it will be noted that the bulb 260, secured in intimate contact with the tubes 231, 232 and 233 by means of the clamp 261 is connected through the tube 262 to the interior of the bellows 263. This arrangement includes a charge of volatile fluid of such volume that the entire liquid portion of the charge may be contained in the bulb 260, hence the bellows 263 will have an internal pressure equal to the vapor pressure within the bulb 260. The result, as before explained, is the same as if there were three bulbs 260, one contacting each of the three tubes 231, 232 and 233, with the same quantity of volatile liquid and with all three bulbs connected with the interior of the bellows.

As shown in Fig. 15, the circuit including the wires 110 and 111 is open at the switch 267 and the bellows 263 is contracted, as would be the case immediately after the completion of a freezing period by the evaporator section connected with the tube 231, which is shown with the valve 234 open so that refrigerant vapor is free to pass into the housing 241 of the valve mechanism and out through the tube 71 to the suction side of the compressor.

The refrigerating effect of the tube 231 upon the bulb 260 has just caused the opening of the switch 267 and the bulb 260, being no longer refrigerated, will now warm up, approaching the temperature of air within the refrigerator. The resulting expansion of the bellows 263 will move the arm 254 upward at the right end, pushing downward on the pawl 253, which engages one of the three holes in the top of the ratchet wheel or disc 252, as shown in the plan view in Fig. 14. The relationship of these parts is such that the disc 252 will be moved in a counter-clockwise direction as viewed in Fig. 14 something more than 60° and less than 120° before the arm 254 has tilted the switch 267 to the position which recloses the circuit and starts the motor. The movement of the disc 252 and shaft 250 causes the arm 248 and the point 247 to move correspondingly, since the arm 248 is secured to the shaft 250 by means of the set screw 249.

In any of the foregoing views, Figs. 4, 7, 10, 14, 15 and Fig. 11 with reference to Fig. 10, the switch might be shorted by connecting wire 110 to wire 111, or separating the switch as in Fig. 6. The ice making periods would then follow each other consecutively in accordance with Fig. 24, which will be described later.

After the point 247 has been moved something more than 60° and less than 120° and before the switch 267 has reclosed the electrical circuit, the spring 245 will have assumed an angle at which it will cause the stem 243 to tilt upon its pivot point 238 to close the valve 234 and open the valve 235 (Fig. 16). The release of the spring pressure acting against the pawl 253, will under normal conditions, allow enough additional expansion of the bellows 263 to immediately move the switch 267 to the closed position, but in any event the switch will close soon after the valve mechanism has snapped to the new position.

The snapping over center of the spring 245, which is held in place solely by its pressure against the cups 246 which engage the two points of 243 and 247, will normally cause the ratchet disc 252 to move ahead, away from the propelling pawl 253, to find a new point of rest midway between the two valves which it is now holding closed. Contraction of the bellows 263 caused by the cooling of the tube 232 which connects with the now open valve 235 and with the active evaporator section will gradually tilt the switch 267 toward the open position and will meanwhile lift the pawl 253 until it falls into the next hole in the top of the disc 252. The adjustment must be such that the pawl falls into the next hole before the switch closes the circuit again, as otherwise the next freezing period would be initiated in the same evaporator section which was last active.

At the third cycle of compressor operation the cooling effect will be on the third evaporator section with the valve 236 open and the bulb 260 will be cooled by the tube 233. The adjustment of the spring 265 by means of the screw 266 allows for setting the temperatures of operation. The control assembly 255 is provided with a cover 256, which is removed in Fig. 15. The wall 240 supports the valve mechanism and the housing 241 is secured thereto by means of screws with a gasket to insure a gas tight fit.

As in the case of the dual valve and two evaporator section designs, it is also permissible to separate the thermostatic switch from the valve actuating means, by merely taking the switch out of assembly 255 and providing a separate thermal switch, as is done in Fig. 6. This would change the cycle of operation to that illustrated by the chart shown in Fig. 26, whereas the cycle produced by a control of the type shown in Figs. 14, 15 and 16 is similar to that shown by the graph in Fig. 25, except that another curve would be added to F and G to represent the third evaporator section.

Another method of separating the ice-making cycles from the thermostatic control of the condensing unit (motor and compressor) is to employ time actuated means as illustrated in Figs. 17 and 18 to control the refrigerant valves in the two or more suction passages and to add a separate thermostatic switch of conventional type to control the motor.

Referring to Fig. 17, the motor 270 drives the vertical shaft 271 on which there is a worm 272 driving the worm wheel 273, which is free to rotate upon the fixed horizontal shaft 274 (seen in Fig. 18). The planetary shaft 279 has its bearing in the worm gear 273 and keyed to this shaft, which is free to rotate in the worm wheel 273, are the gear 278 on one end and the gear 280 on the opposite end. The gear 278 meshes with the fixed gear 277 and is driven thereby as the shaft 279 is carried around the fixed shaft 274 by the worm gear 273. The gear 280, being keyed to the same shaft as gear 278, rotates with it and drives the smaller gear 281 (Fig. 18), which is free to rotate upon the fixed shaft 274.

By selecting suitable numbers of teeth for these four spur gears it is possible to obtain a very great ratio of speed reduction between the worm wheel 273 and the driven gear 281 with its extending shaft 282 to which the arm 283 is keyed. Assuming that the fixed gear or pinion 277 has seventeen teeth; that gear 278 has thirty-two teeth; that gear 280 is of a finer pitch and has forty-nine teeth; and that the driven gear or pinion 281 has twenty-six teeth; the speed reduction may be calculated as follows:

$$\frac{17}{32} \times \frac{49}{26} = \frac{833}{832} = 1.0012+$$

which means that the gear ratio is only a trifle over one to one. It is obvious that a ratio of one to one would make the gear 281 stand still with reference to the stationary gear 277. Instead of standing still the gear 281 does make .0012 of a revolution for each revolution of the worm wheel 273, or in other words it revolves at 1/833 of the speed of worm wheel 273. By employing a single threaded worm 272 with eighty teeth on the wheel 273 a reduction of eighty to one is obtained, making the total ratio of speed reduction 66,640 to 1.

Assuming a motor speed of 1750 R. P. M. it will be found that the gear 281, shaft 282 and arm 283 will make one revolution in approximately thirty-seven minutes. When this period is divided into two parts, as in the case of a dual evaporator ice maker, employing a valve mechanism as shown in Fig. 7 with gear 182 mounted on shaft 282 of Fig. 18, it will provide about eighteen and one-half minutes of freezing time and an equal length of melting or ice-freezing time for each of the two evaporators of the ice maker. Should the shaft 282 be employed to drive the shaft 250 of Fig. 15 with no further gear reduction it would provide one-third of thirty-seven minutes, or twelve and one-third minutes of duration for forming ice with each of the three evaporators (see Fig. 23 for diagram of pipe connections). This latter combination allows twenty-four and two-thirds minutes for melting ice free from the surface upon which it has been frozen by each of the three sections of evaporator units.

When a cycle as illustrated by the diagram in Fig. 25 is employed, using a mechanism similar to that illustrated in Fig. 15 driven by the gears of Figs. 17 and 18 at the speeds above outlined, twenty-four and two-thirds minutes plus three idle periods of probably twenty minutes each would result, or nearly an hour and a half of time for the ice blocks to free themselves from the surfaces upon which they have been frozen. This assumes that the chart in Fig. 25 be taken in view of Fig. 23 to represent the cycle of three evaporator sections, or in other words, inserting the idle period after each freezing period of the chart in Fig. 26. It also assumes that motor 270 is connected in parallel with motor 87 (Fig. 3 or 23) to re-start thermostatically after it has stopped itself at the end of the freezing period of one of the evaporator sections, and that the switch is kicked off by the snap action of part 243 (Fig. 15).

In further explanation of Figs. 17 and 18 it should be noted that the shaft 271 may be extended above the motor (in the case of a condensing unit and control drive in a compartment below the refrigerated space) into the refrigerated space to drive the fan 289, which may be provided to circulate the air in the cabinet for the purpose of keeping a more uniform air temperature and to assist in defrosting or freeing ice as disclosed in my co-pending applications above identified. The shaft 288 may be located in vertical position as shown or otherwise as required to actuate valves, shutters for control of air flow, etc. It is actuated by the means shown in Fig. 18 from the slow moving shaft 282 by means of the arm 283 and the spring 284. The arm 287 on one end (shown as the lower) of shaft 288 is connected with the arm 283 by means of the spring 284 with a ball 285 attached to one end of the spring and seated between two prongs of a fork 286 on the outer end of arm 283. This end of spring 284 travels in the circle described by the outer end of the slowly revolving arm 283, causing the arm 287, to which the other end of the spring is attached, to move alternately to positions 287 and 287'. At the position shown in Fig. 18 the spring 284 would have moved the arm 287 to the position 287' and sometime before the shaft 282 has turned another 180° the spring 284 will cause the arm 287 to move back to the position shown by solid lines.

It should be noted that the angular movement of the shaft 288 is stopped by the valve or shutter mechanism to which it is attached and which it operates. In various designs the shaft 288 may be made to actuate the pawl 127 of Figs. 4, 5, or 6; it may be fitted with a crank and pin such as 183 in Fig. 7 and made to operate the connecting rod 184; the shaft 205 of Fig. 11 or 250 of Fig. 15 may be an extension of the shaft 282 in Fig. 18, etc. Only a few of the mechanical connections possible between the elements of this invention are shown because these possibilities are too numerous to cover in detail, but it should be understood that all such combinations are within the scope of my invention.

It will be understood that the motor 270 of Fig. 17 may be of a horizontal instead of the vertical type shown and that suitable gears would allow the driven shaft 282 or the rocker shaft 288 to extend in any direction. The motor and gear mechanism may be located within the refrigerated space of a refrigerator cabinet if desired, since the heat output of the small motor required is negligible or almost so. The motor and gear mecahnism may be located above or below or at one side of the refrigerated space, according to the details of design. It is permissible to allow the motor 270 to operate continuously, or it may be wired in parallel with the motor 86 of the refrigerating system so that the gear drive is idle whenever the compressor is idle.

While the evaporators and ice water tank, cabinet, etc. employed with the present invention may be the same as disclosed in any of my co-pending applications mentioned at the beginning of this specification, in Figs. 19, 20 and 21 is shown an improved form of ice water tank and evaporator particularly suited for use in this connection.

Referring to Fig. 19 the cabinet 51 will be recognized as a type covered by my previously identified applications, particularly by Serial Number 697,124.

The clearance pocket 119 in the door for the water faucet 118' allows the tank to be located nearer to the door. The drain pan and trap construction for disposing of water assumes use of the disclosure in my co-pending application Serial No. 8,879, filed Feb. 21, 1935.

The tank 301 is here shown equipped with a removable lid 302 which is fitted with a molded rubber gasket 303 embracing its margins to insure a substantially air-tight joint with the tank so that "breathing" of air into and out of the tank may be minimized, protecting the ice and water within the tank from contamination with food odors and tastes. In order that the cover 302 may be held securely and tightly in place at all times, except when it is lifted for the purposes of adding water to or removing ice from the tank, I have provided the toggle-clamping means which is described below.

The cover 302 is provided on its upper surface with two ears 304 (304' in open position) which provide bearings for a shaft which is rigidly connected with two links 307, one on either side of the tank. Each of the two links 307 is hinged to a shorter link 308 by means of a pin which is integral with a knob 309 and the short links 308 are pivotally attached by pin 310 to an upright leg of the forward hanger strap 306.

To lift the cover 302 and slide it rearward to the dotted position indicated at 302' one grasps the two knobs 309 and pulls them forward and upward till the shorter links 308 assume the position 308' shown in dotted lines. This causes the longer links 307 to assume the position 307' which is also shown by dotted lines, moving the ears 304 to the position 304' and the lid 302 to the position 302'. In this position the cover is well out of the way, allowing easy access to the tank for removal of ice, which is accomplished by means of a perforated scoop, wire ladle, or other suitable implement. The location of the tank and the form of the cabinet allow the user to pour water into the tank from a pail or other container by merely opening the cabinet door and raising the tank lid as above described.

To facilitate this operation of raising the tank cover I have provided the weight 305, attached to the cover 302 near its rear end. This weight causes the cover to tilt to the position shown by dotted lines when the cover is moved to the rear in opening it. The gasket 303 or other suitable soft material is arranged to stop the rearward movement of the cover by striking the rear lining of the cabinet when the cover moves to the open position, thus protecting the lining of the cabinet from damage in the event that the cover is opened quickly.

To close the tank it is only necessary to grasp one or both of the knobs 309 and swing them down to the closed position, where the toggle locking action of the links 307 and 308 hold the cover tightly down on the tank 301. An extension of the hinge pin, of which knob 309 is the head, strikes the hanger 306, preventing the toggle levers from going too far over center in the closing movement. This clamping of the cover down on the tank also serves to aid in holding the tank itself down against the evaporator surfaces 318 (see Fig. 21) in good thermal contact therewith, since the hinge pins 310 are attached to the hanger 306 and not to the tank. Also, since none of this mechanism is attached to the tank itself, the tank may be removed by simply lifting the cover and pulling the tank forward out of the cabinet, which is an important feature in allowing the tank to be kept in good sanitary condition.

It will be noted that the type of evaporator elements used in this construction allows the tank to be removed by a straight forward movement without lifting the tank up from the evaporator elements, as was necessary in some of the designs disclosed in my earlier applications previously identified herein. For shipment and handling of the cabinet assembly the tank and cover are securely clamped in position by merely closing the cover and clamping it with the toggle mechanism shown.

The weight of the tank and its contents and the force exerted downwardly on the tank by the cover clamping means cause the angular surfaces 59 of tank 301 to bear heavily against the evaporator surfaces 318 on the two sides of the tank. These surfaces 318 are preferably flat and are formed upon the several evaporator units 315, which are individually supported pivotally upon one of the two supporting rods 312, of which there is one on each side of the tank. The rods 312 are rigidly clamped in holes in the hangers 306 by means of set screws 311, seen in Figs. 20 and 21. The rods 312 pass through the fins 317 of the several evaporator units 315 on their respective sides of the tank, but the holes in fins 317 provide a considerable clearance for the rods 312, so that each individual evaporator unit is not only free to rock upon its rod 312, but may move toward and away from the tank. A spring 313, located between each evaporator unit and its rod 312, urges the surface 318 against the tank surface 59.

In order to provide a more definite thermal break between the evaporator units 315, fin units 296 are mounted upon the rods 312 alternately with the evaporator units 315, with springs 313 arranged to urge the fin units against the wall 59 of tank 301 in the same manner that the evaporator units are held against the tank.

While fins 317 of the evaporator units are small and are perforated to reduce their area of contact with air, the fins 298 of the fin units 296 are large and are not perforated except by the hole for the rod 312. The fin units 317 have about the same or even more area of contact with the tank than have evaporator units 315, but they have less vertical height adjacent to the tank than have the evaporator units in order that they may be free to rock upon the rod 312 without contacting either of the manifold tubes 61 or 63.

A spring seat 299 (Fig. 20) is located on each of the fin units 296 and an embossed spot of part 319 on each of the evaporator units 315 to receive and retain the corresponding ends of corresponding springs 313. Figure 19 shows five evaporator units 315 and five fin units 296 on the near (right hand) side of the tank, and there are equal numbers of each on the other side of the tank. The rear-most fin unit 296 might be omitted, but it serves to assist in freeing ice frozen by the rear evaporator unit 315. No fin unit is required or shown in front of the front evaporator unit 315 because its location is exposed to warmer air than is the rear unit.

The main refrigerating effect of evaporator units 315 is to cool the tank wall and the water within the tank. The fins 298 and the outer surfaces of the tank 301 do most of the cooling of air within the cabinet and the heat picked up by fins 296 prevents ice blocks 117 from freezing together and aids in freeing them from the tank wall.

Although the various evaporator units are connected by means of manifold tubes 61 and 63, these tubes have a certain degree of flexibility so that the springs 313 and the freedom of the evaporator units 315 to rock upon the rods 312 insure that each surface 318 makes a good thermal contact with the surface 59 of the tank. This is further aided by the fact that the tank is made of sheet metal having a certain degree of flexibility and by the water pressure within the tank resulting from the static head of water above these surfaces. The flat surfaces, unlike the conical and spherical surfaces shown in some of my previous applications, allow for a small degree of flexibility which has been found in actual use to be ample for the purpose.

Attention is directed to the form of tank 301 by means of which the top forward lip of the tank allows easy pouring of water into the tank and ready access to floating ice without placing the entire front wall of the tank in such close proximity to the door that an excessive heat transmission from the door to the tank is allowed. Also the inclination of the rear wall of the tank allows the cover to be short enough to slide out of the way without sacrificing space at the rear of the tank. What little space is left at the rear of the tank and below the path of the cover is utilized for location of control devices such as 101.

Moisture condensed upon the tank, tubing and evaporator units drips into the pan 74 at each cycle, since any frost formed is melted during the defrosting period of each cycle. Water is drained from the pan 74 through the trap shown and out of the cabinet through the tube 72, after which it is preferably disposed of by the means disclosed in my co-pending application Serial Number 8,879, filed February 21, 1935.

Figure 21 shows a baffle 314, which may be employed to direct air currents more definitely over the fins 317 and to shield the fins from dishes placed in the cabinet. Such baffles are shown supported from the hangers 306 in any suitable manner, allowing a small clearance between the baffles and the fins.

It will be noted that the upper longitudinal corners of the sharp freezer 54 are rounded as indicated in Figs. 19 and 21. This facilitates air flow downward from the fins and aids in cooling the interior of the cabinet and freeing the ice frozen in the tank from the walls thereof as above described.

Figure 22 illustrates the progressive freezing, first of several small blocks 117 of ice on the inner surfaces of the tank 54, and then the large ice block 117' which is formed by growth and merging of the smaller ice blocks in the event that the freezing cycle is considerably prolonged. When such a large ice block is formed is it found that the ice breaks apart very easily upon lines 115, where the smaller separate blocks join during the latter part of the freezing process to form the larger block. This is the result of a modified crystalline structure of the ice at the junctions 115, caused by the two separate crystalline structures meeting and in freezing together forcing a modified arrangement of crystals at the junction.

Fig. 23 is a diagrammatic representation of a system employing a triple valve of a type represented by Figs. 11 to 16 inclusive, with three evaporator sections instead of two. The evaporator units 315 are in this figure represented by the passages 316, which can also be seen in Figs. 20 and 21, where these evaporating passages or spaces are enclosed between the walls 318 (formed integrally with the fins 317) and the sheet metal parts 319, which are soldered or otherwise attached in a gas-tight manner to the fins or the walls 318. The tubes 61 and 63 are soldered to both parts and provided with openings for the passage of refrigerant into and out of the evaporating spaces 316.

In Fig. 23 I have employed the numerals 61 to indicate the inlet manifold to one set of evaporating spaces 316, with numerals 61' to indicate the inlet manifold to another set, and 61'' indicating the inlet manifolds to the third set of evaporating units which are arranged in two groups, one on either side of the tank for convenient utilization of the tank areas 59. The refrigerant circuit is described as follows:

Starting with the compressor 86 the high pressure refrigerant vapor passes through the tube 88 to the condenser 89, where it is condensed to a liquid and flows into the receiver 90. The liquid passes through the tube 91 to the tube 93 and then to the restricting device or expansion valve 94 at which point it is reduced in pressure and delivered through the tube 95 to the sharp freezer 54, where part of the liquid is evaporated. From the sharp freezer the refrigerant, now partially vaporized, goes through the tube 96 to the tubes 326 and 327 since the outlet through the tubes 328 and 329 is blocked at the moment by valves 235 and 236, which are closed. The refrigerant now enters the several evaporator units fed by manifolds 61'' and is further vaporized before it flows out through manifolds 63'' to the tube 231. It now enters the valve assembly 230, which is seen in greater detail in Figs. 14, 15 and 16, through the valve port opened by the lifting of the valve 234 from its seat. The heat exchanger between liquid and vapor tubes is omitted in this diagrammatic view as being a detail which is only required under certain conditions and with certain refrigerants, and being a more or less conventional item.

From the housing of valve assembly 230 the vapor exits through tube 71 and returns to the suction side of compressor 86, which is driven by motor 87. The wiring diagram includes the line conductors 111 and 112 as shown before and the circuit is controlled by the thermostatic control 255, which is seen in detail in Figs. 14 and 15. This control actuates both the switch and the valve mechanism as before described. The mechanical connection between the ratchet wheel or disc 252 (Fig. 23) and the valve assembly 230 (Fig. 23) may be traced in Fig. 15.

One difference between the constructions shown in Fig. 15 and Fig. 23 is noted in the use of one bulb 260 in Fig. 15, whereas three bulbs 321, 323 and 325 are employed in Fig. 23. As previously explained, the action of control 255 is the same for either of these two arrangements, so long as the volatile charge of the control is such that all of the liquid may be contained in one of the bulbs of Fig. 23. There is a slight advantage in the use of three bulbs located remotely from each other in the fact that this obviates a certain amount of the overlapping of temperature drops and rises of the three suction tubes in their effects upon the single bulb 260, but either construction is practicable and can be arranged to produce the desired results.

After the switch of 255 has opened and the valves have been actuated to close the valve 234 and open the valve 235, and the switch has reclosed, starting the motor 87, the flow of refrigerant from the tube 96 to the valve assembly 230 is diverted to pass through the tube 328, manifold 61', the evaporating spaces 316 associated therewith, the manifold 63 and through the port of the valve 235. During the next running period of the motor and compressor, this flow will be again diverted to tube 329, manifold 61', the associated spaces 316, manifold 63' and through the port opened by the valve 236.

The number of evaporator units served during each of these three running periods is preferably constant, though not so shown in Fig. 23. It is obvious that the evaporator units might be operated in four groups instead of three, with two groups on each side of the tank and a quadruple valve designed for opening only one of the four valves at a time. Such a quadruple system is considered to be within the scope of this application and so obvious therefrom that no additional drawing is needed to disclose it.

Figs. 24, 25 and 26 are shown for the purpose of explaining in graphic form the operating cycles of the various constructions disclosed in the preceding views. Some of these cycles of operation are possible with apparatus which has been disclosed in the co-pending applications mentioned at the beginning of this specification and there are cycles not illustrated by graphs which are possible with the apparatus herein disclosed, but these graphs should serve to clarify any faults of description or inadvertent omissions of details from my descriptions of the foregoing figures.

In Fig. 24 temperatures in degrees Fahrenheit are marked off by horizontal lines in accordance with the scale of figures at the left side of the graph, while time in minutes is indicated by the figures appearing at the top of the figure. The broken line A plots variations in temperature of air within the refrigerator employing a control similar to that shown in Fig. 6 wherein the ice-making cycles and the condensing unit cycles are separately controlled.

The broken line B indicates typical temperature variations of one of the two evaporator sections or of one of the two suction passages, for instance, the tube 70 of Fig. 6. The solid curve C marks the temperature changes of the other suction passage, for instance, the tube 69 of Fig. 6. The dot and dash line D indicates typical resultant temperature changes of the bulb 140 in Fig. 6.

Starting at the left of Fig. 24 with the downward curve of B resulting from refrigeration in the evaporator section served by the suction tube 70, leading to the open valve in the assembly 75, it will be noted that the temperature drops to about five degrees, pulling the temperature of the bulb 140 down to slightly below 10 degrees while the temperature of the tube 69, as indicated by the curve C rises to 32 degrees or higher. The drop of bulb temperature causes the valve mechanism (shown in Fig. 6 with reference to Fig. 4) to operate, opening the valve 83 controlling the tube 69 and closing the valve 82 controlling the tube 70. This immediately stops refrigeration of one evaporator section and of the tube 70 and starts refrigeration of the other evaporator section and to a lesser degree of the tube 69. This allows the bulb (curve D) to warm up, since it will take several minutes for the "frost-back" of the tube 69 to produce much effect upon the temperature of the bulb 140.

The bulb 140 being exposed to air temperature, warms up more rapidly than the tube 70 for eight minutes as shown on the chart, but then the "frost-back" begins to produce its effect and the temperature of bulb 140 drops quite rapidly for a few minutes and the curve then flattens out, falling radually to the "kick-over" temperature of about 9 degrees at the end of the second 20 minute period, which again starts refrigeration in the original evaporator section and the curve B begins to drop.

Without some control of air temperature within the cabinet, this cycling would go on until the air within the cabinet had been pulled down to so low a temperature that the ice would not be melted free from the surface upon which it is frozen in time to allow for the next freezing cycle on that side of the tank. The result would be that ice would continue to build up on each side of the tank in large blocks which would eventually join in the middle of the tank and make one large piece of ice, which would not be conveniently usable. This result is avoided by the use of a thermostatic control similar to those in common use for controlling refrigerating systems, but in this case operating on cabinet air temperature for the purpose of stopping the condensing unit before the air in the cabinet has dropped to so low a temperature that the ice blocks are in danger of failing to release at each non-freezing period, while ice is being frozen on the opposite side of the tank.

On the vertical line marked by 90 minutes in Fig. 24 we see that the cabinet air temperature has fallen to about 42 degrees and that at this point the switch was opened by the temperature drop of the bulb 152, causing all of the curves of the graph to assume upward trends. This will continue until the air temperature rises to some predetermined limit, preferably below 50 degrees, at which temperature limit the switch of control 154 re-closes and cycling of the ice-maker will resume at the point it left off, pulling the curve B downward again on a freezing period which was interrupted by the cutting out of the thermostatic switch and pulling the other curves down more gradually.

Fig. 25 represents the cyclic operation of a system using a control similar to that illustrated in Fig. 4, where an idle period of the condensing unit occurs at the end of each freezing period on one side of the tank. This provides a greater period of time for melting the ice free after each freezing period by utilizing the idle time of the condensing unit between freezing periods instead of having long idle periods of the condensing unit at less frequent intervals.

The coordinates of this graph are similar to those of Fig. 24 except that the time scale is more condensed to show 240 minutes of operation instead of 120 minutes. The broken line E indicates cabinet air temperature, which is held within closer limits than in Fig. 24. Solid line F is a curve representing the temperature of one evaporator section; broken line G is the curve of temperature of the other evaporator section; and curve H represents the temperature of control bulb 103 in Fig. 4.

Starting with the four curves at the left of Fig. 25 it will be noted that all are rising, indicating that the motor is idle. At the end of the first 40 minutes the bulb temperature, as indicated by the curve H, has risen to about 42 degrees, approaching the 44 degree temperature of the air in the cabinet. This is the cut-in point of the control and refrigeration starts with the control in the position shown in Fig. 4, refrigerating the evaporator section served by the suction tube 70 and the open port of the valve 82. Thus the curve F may be taken as representing the temperature of this evaporator section. This temperature drops rapidly, but flattens out toward the end of the twenty minute running period, at which time the temperature of the bulb 103 has fallen to about nine degrees and the switch 109 opens, stopping the motor and compressor. During this running period the cabinet air temperature has dropped from about 44 degrees to about 42 degrees, but this drop has no appreciable effect upon the control, which operates upon the temperature of the bulb 103. This bulb temperature approaches, but does not fall so low as the temperature of the active evaporator section represented by the curve F.

Now that the refrigerating system has been stopped the temperatures all rise and the bulb (curve H) approaches the temperature of the air in the cabinet, which has in about forty-five minutes of idle time reached approximately 44 degrees again. The bulb, having risen to about 42 degrees causes the bellows 104 to expand, actuating the valve mechanism to open the valve 83 and re-closing the switch 109 to re-start the motor and compressor.

Since the valve has switched to the other side the other evaporator section served by tube 69 will now be refrigerated and curve G will now be caused to drop. At about 125 minutes from the start of the chart we note that curve H has again dropped to the cut-out point and another idle period is initiated.

Ice frozen during the first drop of curve F (a 20 minute period) has 130 minutes in which to free itself from the wall of the tank, since refrigeration is not again started on this side of the tank until the 190 minute line is reached. The time allowed for melting ice free is the idle time following the freezing plus the freezing time on the other side plus the idle time following the freezing on the other side of the tank. The time will vary according to the rapidity with which the cabinet warms up, cutting down the idle time and the total time for melting the ice free when the weather is warm or considerable warm food is placed in the cabinet or the cabinet door is opened frequently. This produces more ice when it is needed and provides more time for melting the ice free when the temperature is low and more time is required for that purpose. This principle of control which causes the refrigeration to start with a rise of cabinet air temperature and stops refrigeration in response to a drop of temperature which goes with the finishing of the freezing of ice on one side of the tank or one section of the tank is here employed to great advantage by causing the valve mechanism to operate during the warming-up or idle period.

The control shown in Fig. 15 would produce a chart like Fig. 25, but with three evaporator curves in place of the two. Each evaporator unit of a system operated by the control shown in Fig. 15 will have still more time for defrosting and allowing the ice to float free. This defrosting time will be the idle time following the making of the ice; plus the running time of the second evaporator section; lus the idle time following the second running time; plus the running time of the third evaporator section; plus the idle time following the third running period. The time available for melting the ice free is, therefore, three idle periods plus two running periods.

With a control system such as this there is no need for the use of artificial air circulation, for the use of warm liquid for freeing ice, nor for any other artificial heating means in the harvesting of the ice by flotation.

Fig. 26 shows temperature curves of a system having three evaporator sections as shown in Fig. 23, but with the thermostatic switch separate from the valve actuating mechanism, as in the case of the motor driven valve mechanism shown in Figs. 17 and 18 when used to operate a triple valve such as shown in Fig. 15 independently of the thermostatic switch.

The curve K is cabinet air temperature; the curve L is one of the evaporator sections; M is the next evaporator section; N is the next; and P is the temperature of the bulb 260 of Fig. 15, which is here assumed to be used to actuate the valves with switch 267 removed and replaced by a separate thermostatic switch operated by variations in cabinet air temperature as indicated by curve K.

It should be understood that in Fig. 26 the valve mechanism may be operated on a time cycle, as by the motor and gears of Figs. 17 and 18 combined with the construction shown in Fig. 15 minus the control unit 255, or it may be thermostatically operated as by the construction shown in Fig. 15 minus the switch 267, both independent of the thermostatic switch which controls the motor driving the compressor. In either case the time for melting ice free from the surface upon which it has been frozen is equal to the time taken in freezing ice on the other two sets of surfaces.

When the valve actuation is by a timed mechanism the curve P has no significance, but in the event that the valve mechanism is thermally actuated the curve P represents the temperatures of the bulb 260 (Fig. 15) or the temperature effective upon the bellows in the case of three bulbs connected with the same bellows or other pressure responsive device.

Figs. 27, 28 and 29 show a style of cabinet in which the lining is formed to promote air circulation over the fins of the evaporator units and to avoid the "dead-air" spaces found in the upper corners of conventional refrigerator cabinets.

Referring to Fig. 27 it will be noted that the cabinet 336 is provided with a door 337 of the general type disclosed in my before mentioned copending applications and that the ice and water tank 53 and the sharp freezer 54 are located as in previous views in this application. The lining 339 of the cabinet is, however, formed with a much greater radius than usual at the top, leaving a U-shaped space across the back and on the two sides between the lining and the insulation. This space may be utilized for tubes, wires and control devices.

Fig. 28 shows a front elevation, partly in section, of the same cabinet, illustrating the location of parts such as control 101 and heat exchanger 66 in the space left below the top 338 and immediately outside of the liner 339. The top 338 is preferably made removable for access to the control assemblies, tubing, wiring, etc., located in the U-shaped space of substantially triangular section between the liner and the cabinet wall insulation.

Fig. 29 shows a partial top view of the cabinet and illustrates an optional form for the top of the door, looking down on the top of the inverted L portion of the door, which is provided to allow ready access to the ice and water tank 53. The insulating or "breaker" strip 341 on the cabinet across the top of the door opening is curved so as to make the connection between the two side breaker strips (not shown) with one piece of material. The curved L projection on the door is less in the way when the door is open than is a straight one, as shown in my previous applications.

Fig. 30 illustrates another method of providing the rounded interior walls and allowing space for parts of the system. The cabinet 345 is provided with an insulated wall 365 made of molded insulation 369, which is preferably porous in its interior and vulcanized or otherwise treated as by a suitable enamel-like or other coating to make the exposed surfaces inside and outside considerably harder than the interior. The metal hood 346 fits over the top of the cabinet and protects the parts located above and supported by the removable top 366, which may, if desired, be made of the same material as the other insulated walls of the cabinet. The step 367 or part 365 is inter-fitting with the step 368 of part 366, holding the top wall 366 in place, but allowing its removal by sliding forward when the door 347 is opened (see Figs. 32 and 33).

The motor-compressor assembly 350 is supported by and removable with the wall 366, as is the condenser 351, which is of tubular construction with fins 352. The baffle 353 (Fig. 31) causes incoming air to be drawn over the condenser while baffle 355 directs the air to flow over the motor 356 as circulated by the fan 357 and exhausted through the grill 358. The evaporator 359 may be of one of the ice-maker types previously disclosed. It is shown supported by hangers 360 from the removable top 366.

Fig. 31 is a top view of the construction shown in Fig. 30 with the cover or hood 346 removed, showing the locations of parts above mentioned.

Fig. 32 is a section of Fig. 30 on the line 32—32, showing the downward curvature of part 366 at the rear to provide the rounded effect for air flow.

Fig. 33 shows a partial front view of the cabinet with the hood 346 and door 347 in place, illustrating the same form of door which is also seen in Fig. 32.

The construction shown in Figs. 30 to 33, inclusive, does not necessarily require that the condensing unit parts be located above the cabinet, but they are so shown to illustrate the utilization of space made available by the curvature of the inner walls of the cabinet.

Formal changes may be made in the specific embodiments of the invention described without departing from the spirit or substance of the broad invention, the scope of which is commensurate with the appended claims.

What I claim is:

1. In a refrigerating system, in combination, a plurality of evaporators in parallel circuit, valvular means for controlling the flow of refrigerant in said system through said evaporators, switch means for controlling the operation of said system, and a common actuating means for both said means, the construction and arrangement of said common actuating means and said valvular means being such that the refrigerant is caused to refrigerate said evaporators singly and successively.

2. In combination, a refrigerating system, means forming a plurality of refrigerant evaporator paths therein, thermostatic means for starting said system, valve means so constructed and arranged as to open one of said evaporating paths at a time to the flow of refrigerant therethrough and to close the remainder of said evaporating paths to the flow of refrigerant therethrough, timed controlled means for stopping operation of said system after a predetermined length of operating time, and means for shifting said valve means during each cycle of said system to open one of said refrigerating paths closed during the preceding cycle to the flow of refrigerant therethrough and closing the remainder of said evaporating paths to the flow of refrigerant therethrough.

3. In an ice maker, in combination, a refrigerating system, a control therefor, a plurality of evaporating sections in parallel circuit, control means operable to operatively and separately connect each of said sections in said system, and a common means for operating both of said control means, the construction and arrangement of said control means and said common means being such that a refrigerant is caused to refrigerate said evaporating section singly and successively.

4. In combination, a heat insulated chamber, a plurality of refrigerant evaporators in said chamber, a refrigerating system in which said evaporators are connected, means for effecting a flow of refrigerant through said evaporators successively one at a time, means responsive to the particular evaporator being refrigerated during any cycle of said system for stopping operation of said system, and means responsive to the temperature of air in said cabinet for starting operation of said system, and after successive operating periods being effective to cool a different one of said evaporators from the one cooled at the next preceding operating period of said system.

5. In a refrigerating system having means forming a plurality of refrigerant flow paths connected in parallel, snap action valve means for changing the flow of refrigerant as between said paths, a rotatable element for actuating said valve means, and a power means for driving said rotatable element.

6. In combination, a refrigerating system, a valve chamber in said system having a constantly open port and a plurality of closable ports, means for opening one of said closable ports one at a time and closing the remainder thereof simultaneously therewith in an automatically repeated cycle, and heat exchange means associated with said chamber.

7. In combination, a refrigerating system, means forming a plurality of evaporator passages in said system connected in parallel, valvular means operable to alter the path of flow of refrigerant through said passages, ratchet means for operating said valvular means, and temperature responsive means for actuating said ratchet means.

8. In combination, a refrigerating system, means forming a plurality of refrigerant passages connected in parallel in said system, regulating means for directing flow of refrigerant through a portion only of said passages at a time, cam mechanism for actuating said regulating means, and thermally responsive means for actuating said cam mechanism.

9. In a refrigerating system, in combination, valvular means for controlling the flow of refrigerant therein, spring means for actuating said valve means, retaining means for one end of said spring means, and means for driving said retaining means in a rotary path.

10. In combination, a liquid container, a plurality of refrigerant evaporators each arranged in heat absorbing relationship with respect to the exterior surface of a separate submerged wall area thereof, a refrigerating system including said evaporators, and means operable to singly and successively refrigerate said evaporators at predetermined time intervals.

11. In combination, a liquid container, a plurality of refrigerant evaporators arranged in heat absorbing relationship with respect to the exterior surface of a submerged wall area thereof, a refrigerating system including said evaporators, valvular means in said system so constructed and arranged as to refrigerate said evaporators successively one at a time, and means operable at predetermined time intervals for effecting actuation of said valvular means.

12. In the formation of ice in individual masses by first refrigerating separate areas of the wall of a container covered by a liquid until ice is formed on said areas and then causing said ice to melt free therefrom so as to enable it to float free from said areas, the steps of refrigerating one group of said areas, then discontinuing refrigerating said group of said areas, then refrigerating another group of said areas, and then discontinuing refrigeration of said last mentioned group of said areas, and effecting said refrigeration of said groups of areas only during predetermined time intervals.

GLENN MUFFLY.

CERTIFICATE OF CORRECTION.

atent No. 2,145,777.   January 31, 1939.

GLENN MUFFLY.

It is hereby certified that error appears in the printed specification of the above numbered patent requiring correction as follows: Page 8, second column, line 62, for the word "ice-freezing" read ice-freeing; page 12, first column, line 20, for "radually" read gradually; page 13, first column, line 9, for "lus" read plus; and that the said Letters Patent should be read with this correction therein that the same may conform to the record of the case in the Patent Office.

Signed and sealed this 18th day of April, A. D. 1939.

Henry Van Arsdale (Seal)   Acting Commissioner of Patents.